(No Model.)

I. L. ROBERTS.
SECONDARY BATTERY.

No. 396,368. Patented Jan. 15, 1889.

WITNESSES:
CW Benjamin
Bern. T. Vetterlein

INVENTOR,
Isaiah L. Roberts,
BY Henry L. Brevoort

His ATTORNEY.

UNITED STATES PATENT OFFICE.

ISAIAH L. ROBERTS, OF BROOKLYN, ASSIGNOR TO THE ROBERTS-BREVOORT ELECTRIC COMPANY, (LIMITED,) OF NEW YORK, N. Y.

SECONDARY BATTERY.

SPECIFICATION forming part of Letters Patent No. 396,368, dated January 15, 1889.

Application filed May 1, 1888. Serial No. 272,520. (No model.)

*To all whom it may concern:*

Be it known that I, ISAIAH L. ROBERTS, a resident of the city of Brooklyn, county of Kings, and State of New York, and a citizen of the United States, have made a new and useful invention in Electric Batteries, of which the following is a specification.

My invention relates to an electric battery which is adapted for use either as a primary battery or as a secondary battery capable of being stored after discharge by a current of electricity taken either from a dynamo or another battery.

I have discovered, primarily, that much better batteries, particularly for storage purposes, can be made by the use of the salts of various metals as distinguished from oxides now commonly used. Such batteries have never been manufactured, owing to the manifest difficulty of holding the crystals or powdered crystals in contact with the carbon or metal plates or conducting-supports. This difficulty I have overcome, and my invention therefore relates both to the manufacture of batteries using the salts of a metal, and also to means for securing the material in contact with the plates or conductor against which it is necessary to hold the active material.

My invention is illustrated in the accompanying drawings, forming part of this specification, in which the same letters of reference represent the same parts throughout the several views.

Figure 1:
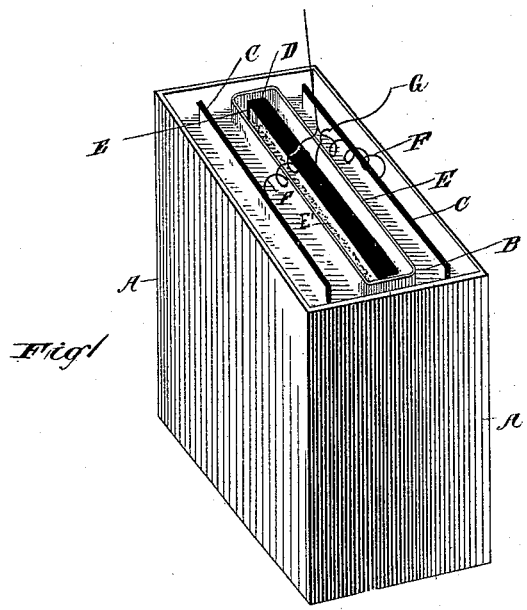
Figure 2:
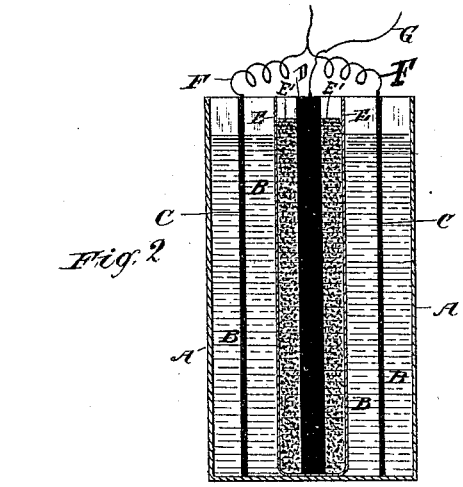

Figure 1 shows a perspective view of an electric battery, and Fig. 2 a vertical section of Fig. 1.

A is an outside cell, of any suitable material; B, the contained pasty mass; C C, the zinc elements, and D the copper or carbon element, whichever is found most desirable to use, although I prefer to use a copper element.

E is a bag or containing medium, made of gelatinized fiber.

E' E' is the salt formed into a paste and spread upon the element D.

F F are the usual connections uniting the zinc elements to be used as one of the poles of the battery, and G the connection with the copper or carbon element forming the other pole of the battery.

All of the foregoing may be changed or altered, either in form or location, without departing from the essence of my invention.

In the practice of my invention I proceed as follows: I take, for example, sheets of copper and I take ordinary blue-stone, (sulphate of copper,) and I preferably powder or comminute the same and form it into a paste, preferably using for this purpose a little starch and water or flour and water, though any vegetable glutinous or animal gelatinous substance will do. It is not necessary to powder the crystals, as they can be used; but by finely comminuting the salt superior results are obtained. I make this paste stiff enough to enable the copper salt to be spread upon the conductor of copper as butter is spread upon bread. When the paste is properly formed, I spread the same upon the conductor, preferably a copper plate, and preferably on each side to the extent of about one-quarter of an inch in thickness, more or less. I insert this covered plate in a cell, and I pour around it preferably a paste made of starch or flour or any paste derived from animal gelatinous or vegetable glutinous substances. This paste is preferably combined with a material added to the water with which the paste is made to make the combined water a better conductor, and for this purpose I may use the salt of any metal which will not act upon the zinc. I prefer, however, the salts of an alkali, such as common table salt or some salt of zinc. The quantity should be sufficient to make the water in the paste a good conductor. I then place in the same cell a zinc element likewise surrounded by the paste which is to fill the cell about the elements. It will now be seen that the metallic salt upon the negative element is held thereon by the paste which surrounds it. The battery is now ready to discharge as a primary battery, and after its discharge as such the metallic salt is reduced. The battery can then be recharged by a current of electricity, when it will again bring the reduced metallic salt back to its previous condition as a salt of the metal.

The action, for example, is simple. As the battery is discharged the copper sulphate is reduced to metallic copper and the zinc element is transformed (partly) into sulphate of zinc. After the discharge and while the battery is being stored the current so used brings the sulphate of zinc back to the metallic condition and the sulphuric acid radical is driven back to the copper, which becomes sulphate of copper again. The battery can be formed with any metallic salt—such as the sulphates, nitrates, or chlorides of any metal—which will unite with zinc or other positive element used. The conductor or support upon which the salt is placed is preferably the metal the salt of which is used, though carbon or platinum can be used with any of the salts as a conductor upon which the salts are spread. Thus carbon serves as an efficient conductor for salts of mercury.

When copper salts are used or any salt which will produce trees when reduced to the metallic state, I proceed as follows: Before inserting my conductor covered with the metallic salt in the glutinous or gelatinous paste I envelop the same in a bag preferably formed of what is known to electricians as "gelatinized fiber." This material does not seem to oppose any deleterious resistance, while it prevents or retards metallic trees which are the product of the reduction of the salt from projecting themselves out into the gelatinous mass, thus preventing the danger of short-circuiting. It will be seen that the gelatinous and glutinous paste holds the metallic salt upon the conductor upon which it is spread, preventing its falling away from the plate and preventing its diffusion throughout the battery, and serving to localize the metallic salt during its reduction to a metal and when it is being brought back from a metal to the state of a metallic salt.

Thus my invention broadly consists of two features, one relating to the use of metallic salts spread upon a suitable conductor in a crystallized and preferably powdered state, and the other feature relates to the holding of such salts in position upon the conductor by the use of the gelatinous or glutinous material.

In an application of even date with this, bearing serial number 272,519, I have described the use of the gelatinous or glutinous paste as applied to storage-batteries in which the oxides of metals are used.

In making the paste which is to surround the elements I may make it as follows: I take preferably ordinary starch and heat it, say, to 212° Fahrenheit when mixed with water, about two ounces of starch to a quart of water, and thus form the paste. If acids are to be used, they must be added when the paste is cold and must be worked into it. If chloride of sodium, caustic soda, and the like are used, they may be added to the water before the cooking of the starch. The addition of sulphuric or other acids to the starch must be made when the starch paste is cold; but other material—such as table salt, caustic soda, and the like—can be added only or before the starch is treated with the water to form the paste.

I need not surround the conducting-support covered in whole or in part with the metallic salt by the paste, for the support may extend across the cell or box and have the salt only on one side. Then of course the paste would only be used on the side of the plate where the metallic salt was placed.

What I claim, and desire to secure by Letters Patent, is—

1. In an electric battery, a conducting-support covered in whole or in part with a salt of a metal, the said salt being formed into a paste and intimately spread upon the supporting-conductor, in combination with a pasty mass through which electrolysis can take place, which pasty mass is adapted to hold the salt in contact with the conducting-support, substantially as described.

2. In an electric battery, a conducting-support covered in whole or in part with a salt of a metal in a finely-divided condition, in combination with a pasty mass through which electrolysis can take place, which pasty mass is adapted to hold the salt in contact with the conducting-support, substantially as described.

3. In an electric battery, a conducting-support covered in whole or in part with the salt of a metal surrounded by an envelope of gelatinized fiber, in combination with a pasty mass through which electrolysis can take place, which pasty mass is adapted to hold the salt in contact with the conducting-support, substantially as described.

4. The combination of a conducting-support formed of metal having upon its surface a salt of the same metal, in combination with a pasty mass adapted to hold the salt in position and to permit of electrolysis, substantially as described.

ISAIAH L. ROBERTS.

Witnesses:
BERN. T. VETTERLEIN,
M. E. STODDARD.